(12) United States Patent
Vasseur et al.

(10) Patent No.: US 9,218,216 B2
(45) Date of Patent: Dec. 22, 2015

(54) CENTRALLY DRIVEN PERFORMANCE ANALYSIS OF LOW POWER AND LOSSY NETWORKS

(75) Inventors: Jean-Philippe Vasseur, Saint Martin d'Uriage (FR); Jonathan W. Hui, Foster City, CA (US); Gilman Tolle, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 779 days.

(21) Appl. No.: 13/188,942

(22) Filed: Jul. 22, 2011

(65) Prior Publication Data

US 2013/0024560 A1    Jan. 24, 2013

(51) Int. Cl.

| G06F 15/173 | (2006.01) |
| --- | --- |
| G06F 9/50 | (2006.01) |
| H04L 12/24 | (2006.01) |
| H04L 12/26 | (2006.01) |
| H04W 84/18 | (2009.01) |

(52) U.S. Cl.
CPC .............. *G06F 9/5061* (2013.01); *H04L 41/12* (2013.01); *H04L 41/142* (2013.01); *H04L 43/06* (2013.01); *H04L 43/08* (2013.01); *H04W 84/18* (2013.01)

(58) Field of Classification Search
CPC ....... H04L 41/12; H04L 41/142; H04L 43/08; H04L 12/4035; H04L 67/2833; H04L 67/42; H04L 67/12; H04W 24/10; H04W 72/04; H04W 52/0232; H04W 84/18; H04N 7/18
USPC .............. 709/224, 226; 455/67.11, 453, 63.1; 370/252, 255, 310, 311
See application file for complete search history.

(56) References Cited

U.S. PATENT DOCUMENTS

| 5,659,787 | A | * | 8/1997 | Schieltz ......................... 709/226 |
| --- | --- | --- | --- | --- |
| 5,999,517 | A | * | 12/1999 | Koning et al. ................. 370/255 |
| 6,729,929 | B1 | | 5/2004 | Sayers et al. |
| 6,785,513 | B1 | * | 8/2004 | Sivaprakasam .............. 455/63.1 |
| 7,274,677 | B1 | | 9/2007 | Lewis |
| 7,558,592 | B2 | | 7/2009 | Hart et al. |
| 7,558,852 | B2 | | 7/2009 | Douglas et al. |
| 7,613,142 | B2 | | 11/2009 | Molteni et al. |
| 7,707,305 | B2 | | 4/2010 | Afek et al. |
| 7,756,542 | B1 | | 7/2010 | Kaiser et al. |
| 7,826,463 | B2 | | 11/2010 | Patel et al. |

(Continued)

OTHER PUBLICATIONS

"RPL: IPv6 Routing Protocol for Low Power and Lossy Networks" <draft-ietf-roll-rpl-19> by Winter, at al. (Mar. 13, 2011 version).

*Primary Examiner* — Dustin Nguyen
(74) *Attorney, Agent, or Firm* — Parker Ibrahim & Berg LLC; James M. Behmke; Stephen D. LeBarron (57) ABSTRACT

In one embodiment, a centralized device for a computer network divides the computer network into one or more regions for which performance is to be measured, and selects one or more nodes within each respective region of the one or more regions. The centralized device may then send a performance measurement request (PMR) to the selected node(s) for each region, and receives measured performance reports from the selected node(s) for each region in response to the PMR. Accordingly, based on the measured performance reports, the centralized device may then adjust at least one of either the divided regions or the selected node(s) for one or more of the one or more regions, e.g., for future PMRs.

19 Claims, 8 Drawing Sheets

(56) References Cited

U.S. PATENT DOCUMENTS

| | | |
|---|---|---|
| 7,904,092 B2 | 3/2011 | Hart et al. |
| 7,936,681 B2 | 5/2011 | Gong et al. |
| 7,936,692 B1 | 5/2011 | Jacobs et al. |
| 7,983,667 B2 | 7/2011 | Hart et al. |
| 8,086,244 B2 * | 12/2011 | Xiao .............. 455/453 |
| 8,565,109 B1 * | 10/2013 | Poovendran et al. ......... 370/252 |
| 2004/0059830 A1 * | 3/2004 | Brown ........................ 709/238 |
| 2005/0117530 A1 * | 6/2005 | Abraham et al. ............. 370/310 |
| 2007/0097895 A1 * | 5/2007 | Keshavarzian et al. ........ 370/311 |
| 2008/0126523 A1 * | 5/2008 | Tantrum et al. ............... 709/223 |
| 2008/0285530 A1 | 11/2008 | Dietrich et al. |
| 2010/0023724 A1 | 1/2010 | Bhandari et al. |
| 2010/0195515 A1 * | 8/2010 | Lin et al. ...................... 370/252 |
| 2011/0045780 A1 * | 2/2011 | Ben Hadj Alaya et al. ......................... 455/67.11 |
| 2012/0023236 A1 * | 1/2012 | Backholm et al. ............ 709/226 |

\* cited by examiner

FIG. 8

CENTRALLY DRIVEN PERFORMANCE ANALYSIS OF LOW POWER AND LOSSY NETWORKS

TECHNICAL FIELD

The present disclosure relates generally to computer networks, and, more particularly, to performance analysis of computer networks, e.g., for service level agreements (SLAs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Gathering performance metrics can either be done on-demand during troubleshooting or on a regular basis to continuously monitor the performance of a network and whether or not SLAs (Service Level Agreements) are being satisfied. In "classic" IP networks, the most common approach consists of using routers as traffic generators to send stamped probes for each Class of Service (CoS) and positioned across the networks (e.g., in each Point of Presence or "POP" of Service Providers). Traffic reports are then collected periodically to monitor the network.

Unfortunately, such an approach is not suitable to LLNs. First, typical LLNs have far more devices operating with strict resource constraints than "classic" IP networks. For example, a typical LLN has 1000-5000 LLN devices that operate both as hosts and routers. Second, because of the strict resource constraints in LLNs, generating any kind of traffic must be done with care to avoid interfering with user traffic.

Existing LLN approaches involve having each device periodically (e.g., every hour) report local statistics (link reliability, frequency of routing topology changes, etc.) to a Network Management System (NMS) where data is aggregated and analyzed. Such an approach is useful but assumes that the sampling rate for local statistics is relatively static and constant across the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a centralized device for a computer network divides the computer network into one or more regions for which performance is to be measured, and selects one or more nodes within each respective region of the one or more regions. The centralized device may then send a performance measurement request (PMR) to one or more selected nodes for each region, and receives measured performance reports from the selected node(s) for each region in response to the PMR. Accordingly, based on the measured performance reports, the centralized device may then adjust at least one of either the divided regions or the selected node(s) for one or more of the one or more regions, e.g., for future PMRs.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a is proactive routing protocol for smart object networks.

Figure 1:
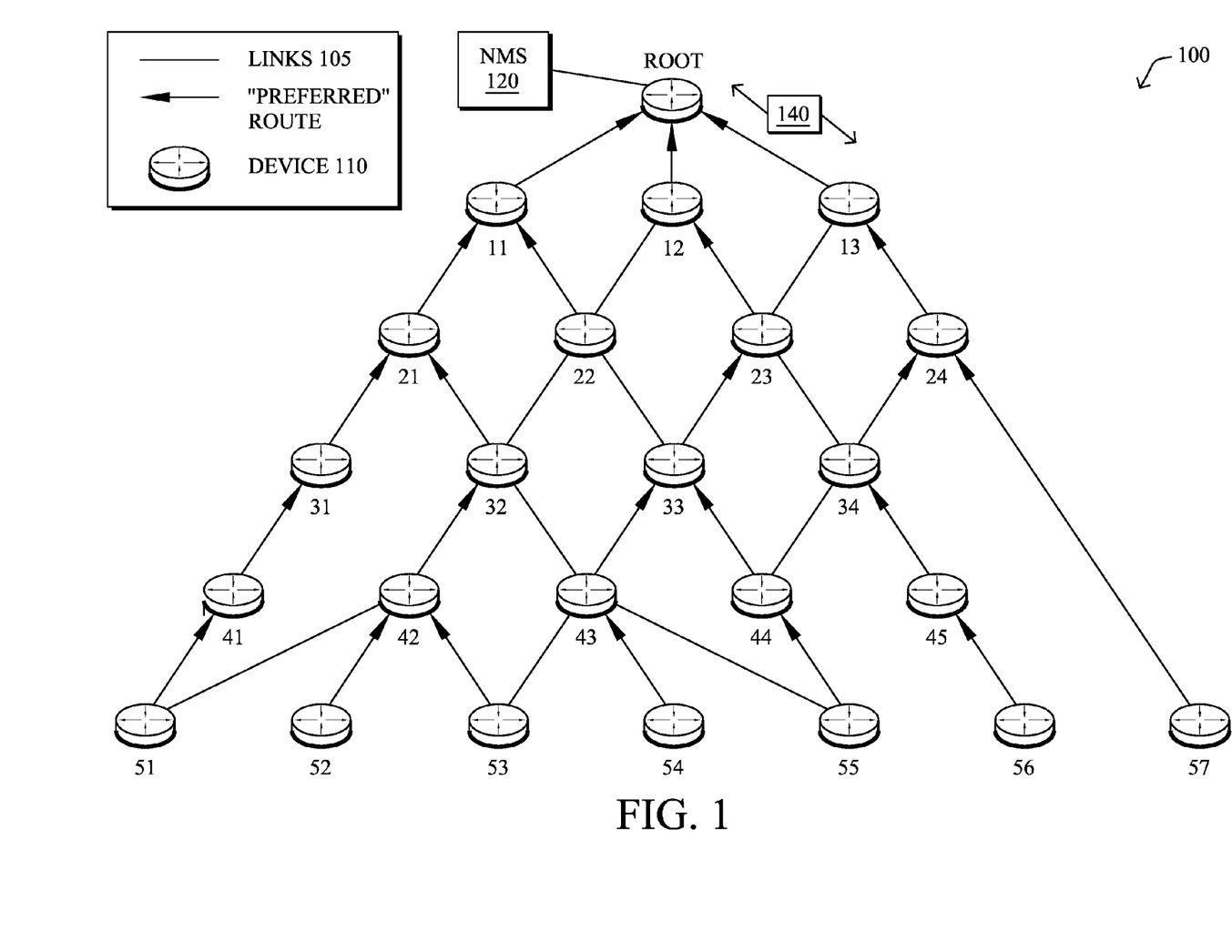
FIG. 1 illustrates an example computer network.

FIG. 1 is a schematic block diagram of an example computer network 100 illustratively comprising nodes/devices 110 (e.g., labeled as shown, "root," "11," "12," ... "57", and described in FIG. 2 below) interconnected by various methods of communication. For instance, the links 105 may be wired links and/or shared media (e.g., wireless links, PLC links, etc.), where certain nodes 110, such as, e.g., routers, sensors, computers, etc., may be in communication with other nodes 110, e.g., based on distance, signal strength, current operational status, location, etc. In addition, a centralized controller/device, such as a network management service (NMS) device 120, may be in communication with the network 100, such as through the root node. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, and/or other shared-media protocols where appropriate. In this context, a protocol consists of a set of rules defining how the nodes interact with each other.

Figure 2:
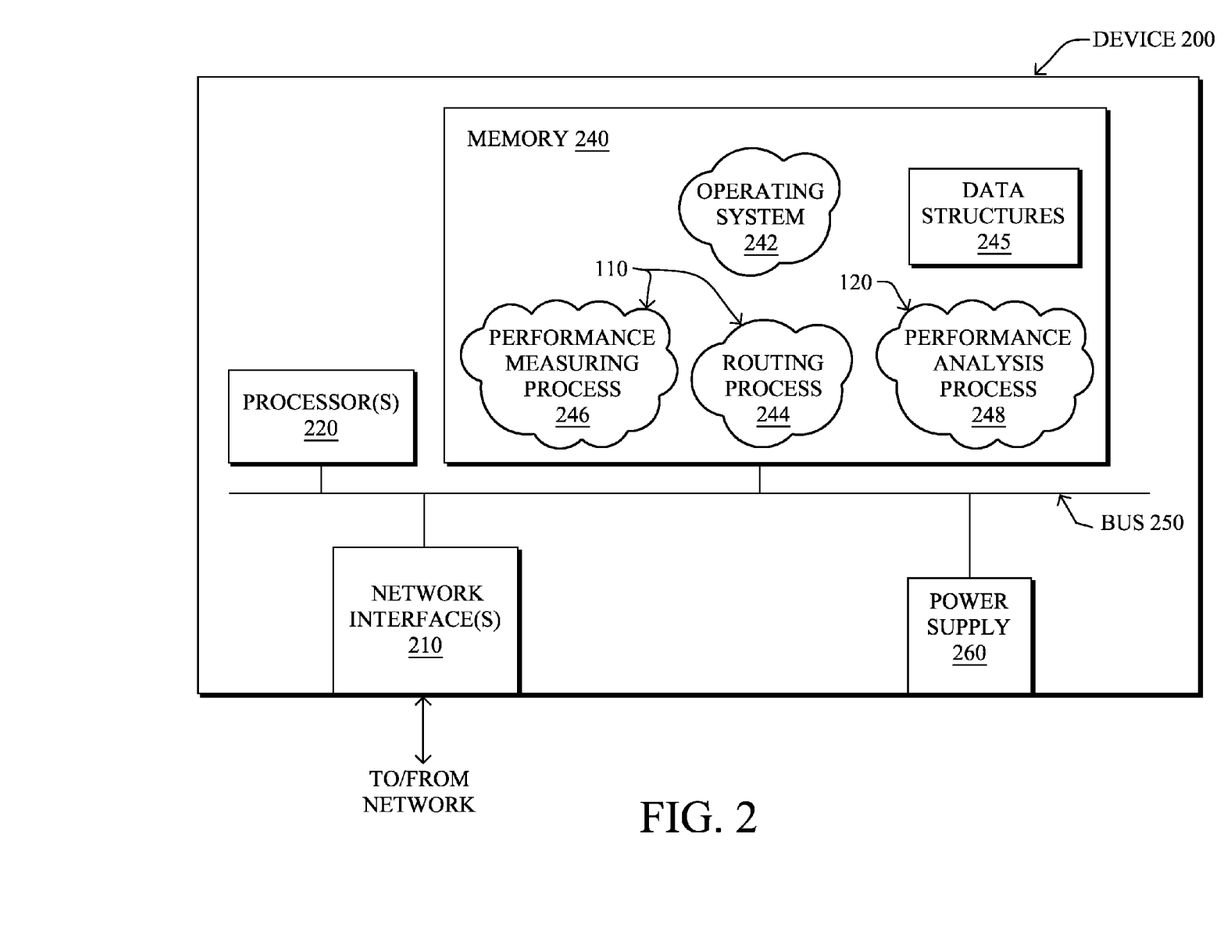
FIG. 2 illustrates an example network device/node.

FIG. 2 is a schematic block diagram of an example node/device 200 that may be used with one or more embodiments described herein, e.g., as any of the nodes 110 shown in FIG. 1 above, and particularly as NMS 120. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown is separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise, on devices 110, routing process/services 244 and an illustrative "performance measuring" process 246, while on the NMS 120 these software processes and/or services may comprise a "performance analysis" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a is routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a is mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic).

RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As an example, the network 100 depicted in FIG. 1 shows an LLN where paths have been computed using a routing protocol, where the arrows show preferred path/route. Note that while the arrows could be considered a DAG, no assumption is made herein on the nature of the underlying routing protocol.

As noted above, gathering performance metrics can either be done on-demand during troubleshooting or on a regular basis to continuously monitor the performance of a network and whether or not SLAs (Service Level Agreements) are being satisfied. In "classic" IP networks, the most common approach consists of using routers as traffic generators to send stamped probes for each Class of Service (CoS) and positioned across the networks (e.g., in each Point of Presence or "POP" of Service Providers). Traffic reports are then collected periodically to monitor the network.

Unfortunately, such an approach is not suitable to LLNs. First, typical LLNs have far more devices operating with strict resource constraints than "classic" IP networks. For example, a typical LLN has 1000-5000 LLN devices that operate both as hosts and routers. Second, because of the strict resource constraints in LLNs, generating any kind of traffic must be done with care to avoid interfering with user traffic.

Existing LLN approaches involve having each device periodically (e.g., every hour) report local statistics (link reliability, frequency of routing topology changes, etc.) to a Network Management System (NMS) where data is aggregated and analyzed. Such an approach is useful but assumes that the sampling rate for local statistics is relatively static and constant across the network. Such existing approaches do not provide an adaptive or triggered mechanism that responds to the actual time-scale and spatial-scale characteristics of the statistics being gathered and analyzed.

Centrally Driven LLN Performance Analysis

The techniques herein specify an adaptive SLA measurement mechanism driven centrally, e.g., by the NMS 120, which divides the networks into regions (dynamically computed) where a representative node receives an indication to probe its corresponding region and gather of set of performance metrics (also dynamically computed). That is, the techniques herein enable the NMS 120 with the ability to dynamically determine which regions to monitor, at what spatial granularity, at what frequency, and for which parameters.

Specifically, according to one or more embodiments of the disclosure as described in detail below, a centralized device (e.g., NMS 120) for a computer network 100 divides is the computer network into one or more regions for which performance is to be measured, and selects a node 110 within each respective region of the one or more regions. The centralized device may then send a performance measurement request (PMR) to one or more the selected nodes for each region, and receives measured performance reports from the one or more selected nodes for each region in response to the PMR. Accordingly, based on the measured performance reports, the centralized device may then adjust at least one of either the divided regions or the selected node for one or more of the one or more regions, e.g., for future PMRs.

Illustratively, the techniques described herein may be performed by hardware, software, and/or firmware, such as in accordance with the performance analysis process 248 on the NMS 120 and the performance measuring process 246 on devices 110, each of which may contain computer executable instructions executed by the processor 220 to perform functions relating to the novel techniques described herein, e.g., in conjunction with each other. For example, the techniques herein may be treated as extensions to conventional protocols, such as various operations, administration, and management/maintenance (OAM) protocols, and as such, may be processed by similar components understood in the art that execute those protocols, accordingly.

Operationally, as described herein, the techniques according to one or more embodiments herein may generally address the following components:

1) The NMS 120 divides the computer network 100 into one or more regions, and sends performance measurement requests (PMRs) to specific representative nodes to collect local/path statistics in a region, e.g., sent by the NMS periodically or on-demand.

2) The NMS uses an adaptive approach to select which nodes to query and with what frequency. The number, location, and size of regions and frequency of sending PMRs are dynamically adjusted based on gathered data or hints from a network operator.

3) The NMS schedules PMRs to minimize interference with other applications, including user applications and other NMS applications.

===Performance Measurement Requests (PMRs)===

Figure 3:
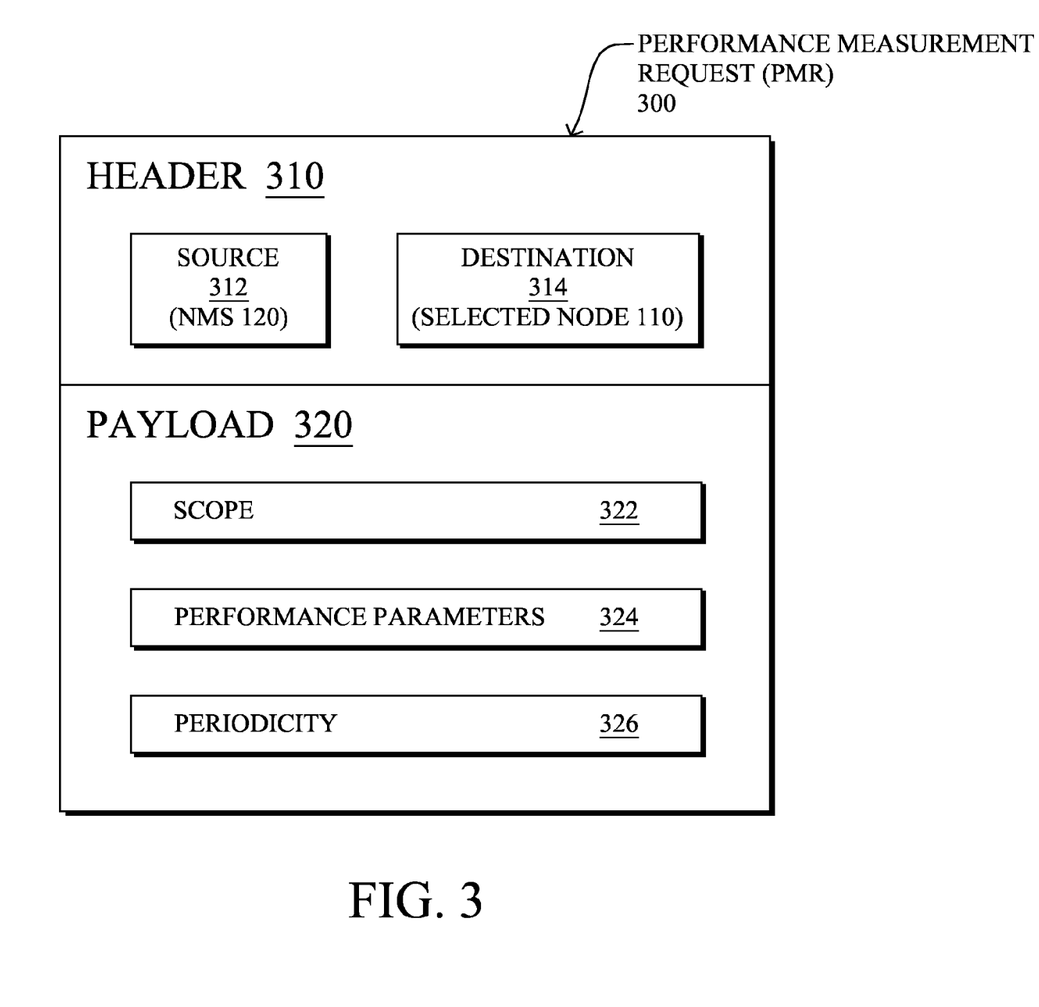
FIG. 3 illustrates an example performance measurement request (PMR)

A PMR is a request packet sent to a node in the network and that specifies several performance measurement parameters. For instance, FIG. 3 illustrates an example PMR message 300 (e.g., a packet 140), which may generally contain of some sort of transmission header 310 with a source address 312 (e.g., of the NMS), destination address 314 (e.g., of the selected node), or other labels or tags to forward the message 300 through the network. In addition, a payload 320 of the message 300 may comprise the one or more specified performance measurement parameters.

Specifically, a scope field 322 may be used to indicate the physical extent of nodes to gather information from. Local scope specifies statistics on the target node itself. A regional scope specifies statistics to gather from a region. For instance, with RPL, a regional scope may be identified by the direction (e.g., upward or downward) and/or the DODAG Rank (e.g., nodes within n hops from the root/target node). In another embodiment, regional scope may be specified by number of hops. In yet another embodiment, regional scope may be specified by physical distance.

Performance parameters field 324 may indicates what parameters are of interest, e.g., based on a particular service level agreement (SLA). For instance, a list of one or more performance parameters to measure may comprise parameters such as local resources (e.g., memory-based metrics, processor-based metrics, and energy-based metrics, etc.) or regional network statistics (e.g., memory-based metrics, processor-based metrics, and energy-based metrics, etc.).

Periodicity field 346 may indicate/specify a number of measurements to be performed by the particular selected node receiving the PMR over a specified period of time. For example, the periodicity of reporting may be set to "1" to request measurement once, or set to "m" to request m measurements for the next "x" minutes, etc.

Figure 4:
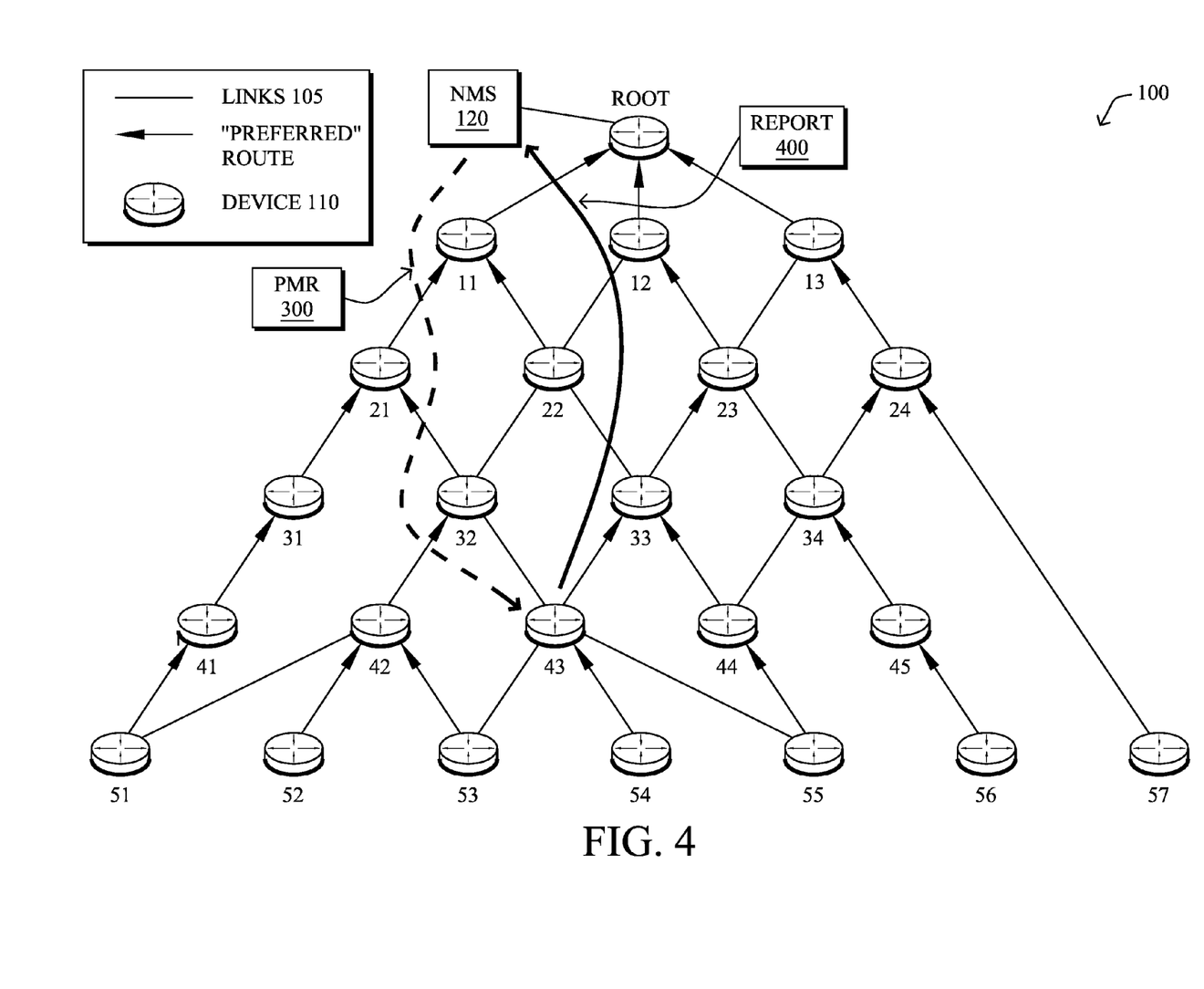
FIG. 4 illustrates an example request-response message exchange in the network of FIG. 1.
Figure 5:
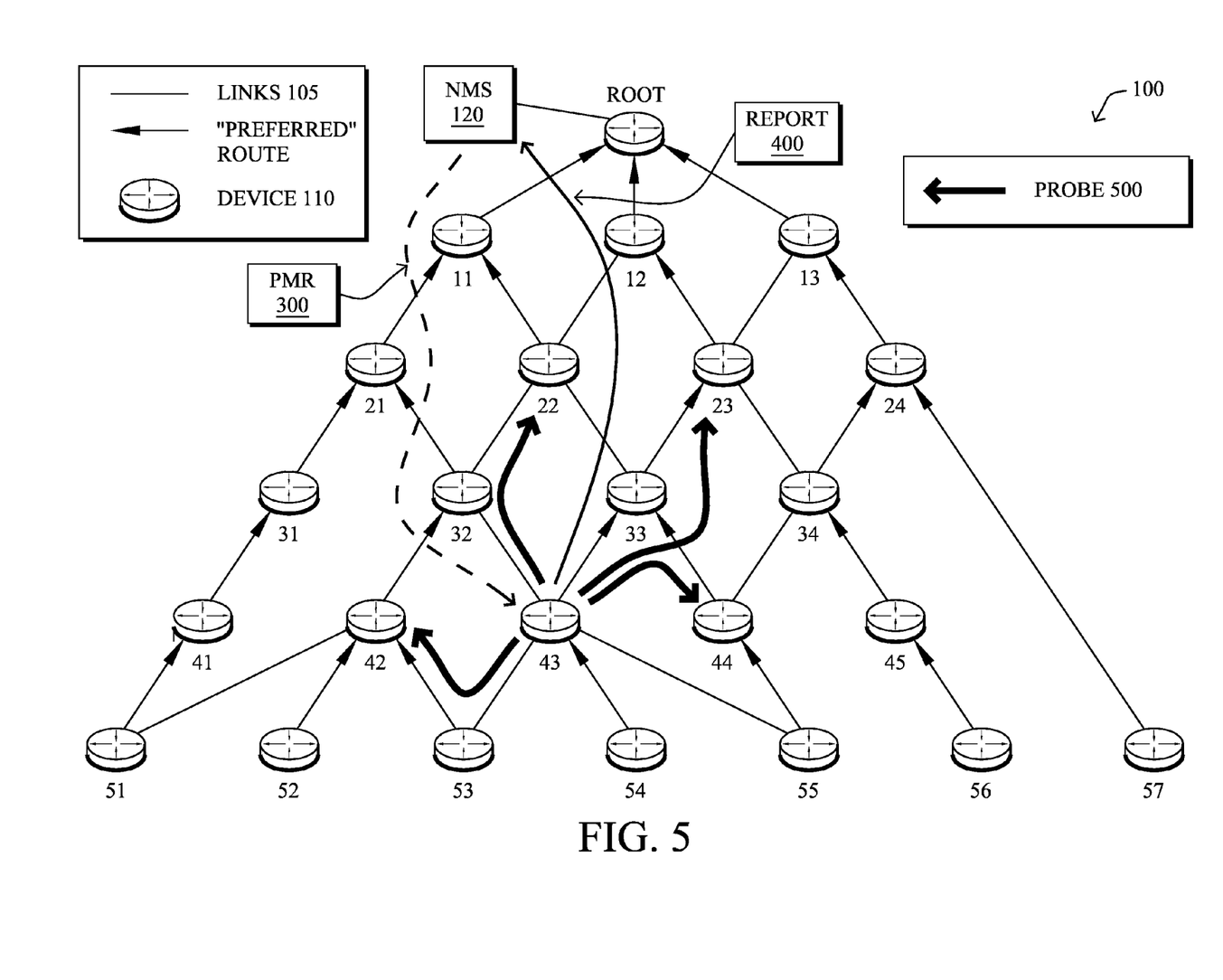
FIG. 5 illustrates an example performance measurement in the network of FIG. 1.

As shown in FIG. 4, for example, the NMS 120 may send a PMR 300 to node 43, specifying the following parameters to be returned in a report 400 to the NMS: report the path quality for all nodes two hops or fewer away (e.g., only those in the UPWARD direction), three times in a row every two minutes. As shown in FIG. 5, various operations, administration, and management/maintenance (OAM) techniques may then be used by the specified node (node 43) could then be used such as various probes 500 (e.g., ping, traceroutes, route recording using in-band performance analysis, etc.), or else local monitoring may be used, depending upon the type of information requested by the PMR.

===PMR Scheduling===

According to one or more embodiments herein, the NMS 120 can determine when and how often to send the PMRs 300 to particular nodes/regions, e.g., based on various network events, triggers, measured performance, etc. In certain embodiments, for instance, the NMS may send PMRs periodically, on-demand in order to perform on-the-fly troubleshooting (e.g., based on network events or a user request), or upon receiving a request from a node detecting an issue in the network.

In another embodiment, the NMS adaptively determines when to send PMRs, in addition to the contents of each PMR, based on where the PMR is being sent. That is, adapting to local conditions within each region is highly important in LLNs to minimize overhead caused by sending PMRs 300 and generating reporting traffic 400 in response to PMRs while sampling and collecting information at the proper time scales exhibited by the queried statistics.

The adaptive PMR scheduling process may also take into account other traffic in the system, e.g., from other applications operating in the network, in order to minimize interference with existing user traffic, which could impact the measurements (e.g., and SLAs) of user traffic. With its centralized information and control, the NMS 120 is a particularly well-suited location to orchestrate traffic from different applications (e.g., firmware upgrades, configuration changes, security updates, etc.) in addition to the PMRs.

Note that PMR-based probes 500 may be given a lower priority in order to not preempt user/data traffic. Note also that if a node is performing measurements and receives, originates, or relays critical user traffic, the node may decide to temporarily suspend performance measurement.

===Region Adaptation===

Figure 6:
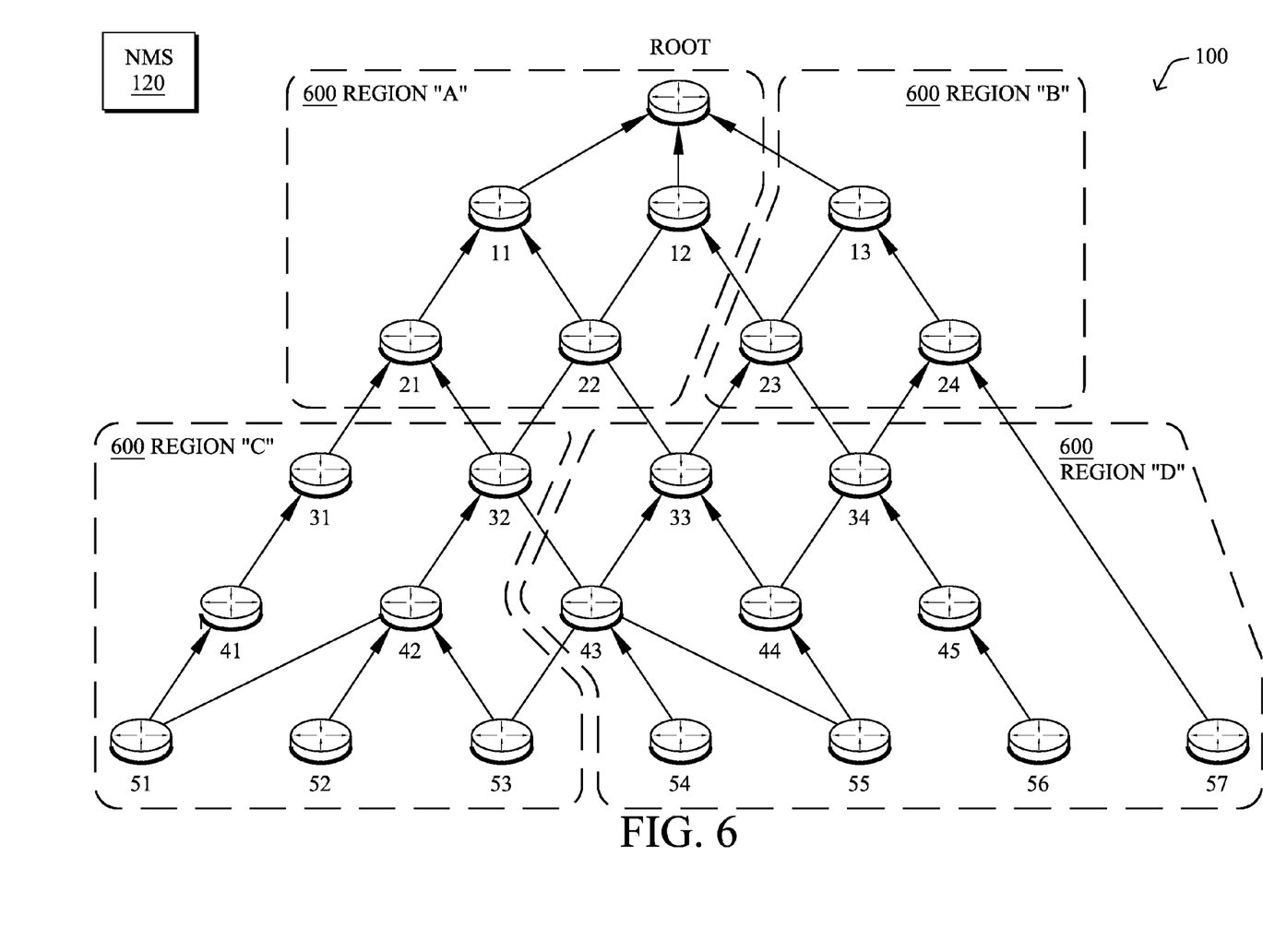
FIG. 6 illustrates an example of performance analysis regions in the network of FIG. 1.

According to one or more embodiments herein, an initial phase consists of dividing a computer network into one or more regions for which performance is to be measured. For example, as shown in FIG. 6, the network may be initially divided into a selected (e.g., pre-configured) number of regions 600 ("A" through "D") of substantially similar size (e.g., based on number of nodes or physical area size) without knowledge of any performance measurements. Note that the NMS may also determine the "a priori" optimum number of regions. The number of regions represents a tradeoff: smaller regions (i.e., higher number of regions) increase the number of PMRs, but lowers the number of data probes generated by each target node; larger regions (i.e., smaller number of regions) may not provide a desired measurement granularity or control.

A node is also selected for each respective region as the target for a PMR 300. Illustratively, the node may be randomly selected, chosen according to its capability and/or attributes (e.g., nodes with high-end processors, nodes with the most memory, etc.), or according to the network state and location of the node, e.g., so as to avoid choosing a node in a congested area, or to select a node with high visibility to other nodes, etc. It may also be useful to select a plurality of nodes within a region, rather than just one node, e.g., for additional redundancy in case PMRs or replies are lost, obtaining additional data from a region, attempting to decide if a region should be split, etc.

sThe NMS then determines a schedule to poll each region with a PMR 300, along with the set of performance parameters {P1, . . . , Pk}. For example, certain parameters may define that a selected target node measure paths of less than three hops to collect latency, jitter, and packet delivery rates. By analyzing the responses to the PMRs (received measured performance reports 400), the NMS may dynamically adjust the number, size, and location of regions, the selected node/target within the regions, the number and type of parameters, and the frequency at which PMRs should be sent.

For example, if a region appears very stable (e.g., statistics exhibiting long time scales), the NMS may send PMRs to the selected node for each selected region with a low frequency. In contrast, if a region appears less stable (e.g., statistics exhibiting short is time scales), the NMS may send PMRs more frequently to the region. In particular, if a parameter Pk is very stable, Pk may not be present in all PMRs (e.g., once every "y" PMRs). On the other hand if a region is seen as fairly unstable (e.g., the rate of change or first derivative of Pk>alpha), then the number of parameters may be increased to gather more data, notably increased up to some pre-defined threshold so as to avoid adversely affecting the already unstable network. (Note again that periodic PMRs may be withheld while user traffic is currently being generated).

Figure 7:
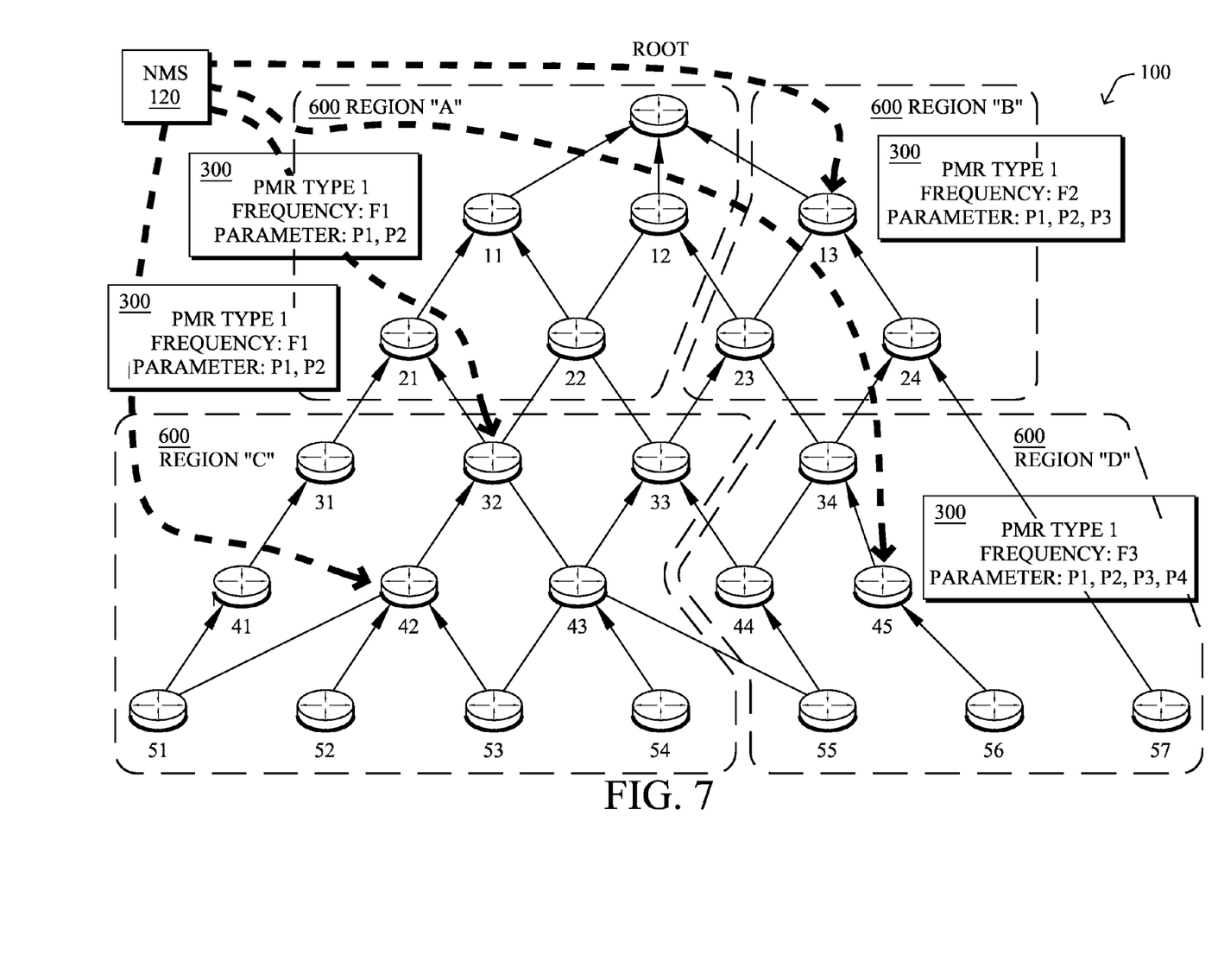
FIG. 7 illustrates an example of dynamically adjusted analysis regions and representative nodes.

FIG. 7 illustrates an example end result of adaptive regional adjustment after a number of iterations based on received performance measurements. Illustratively, for example, region C has been increased in size, and region D has been decreased. Also, as shown, the periodicity at which PMRs are sent varies ("frequency" f1, f2, or f3), and the number of parameters K (P1-P4) also varies, depending upon which region is receiving the PMR 300, accordingly. In general, the overall system (e.g., a "learning machine") described herein will converge toward an optimum between the number of required probes 500 to get an accurate view of the network performance, while minimizing the amount of required control traffic sent during periods where the traffic will not decrease the network resources for the user traffic.

It is also worth pointing out that such a mechanism can also be used to detect anomalies in the network in addition to monitoring the network performance. For example, there are circumstances where in source-routed environment loops may still occur if in-band loop detection is not in use (in other words, the topology database hosted on a DAG root and/or the NMS may not be up-to-date). In this case, a node may also send an alarm detecting such issue, so as to trigger some action by the NMS to start troubleshooting investigation using the techniques described above. Other network events, such as congestion, accelerated packet drops, etc., may also be used to trigger the sending of a particular PMR 300 to one or more particular regions 600.

Figure 8:
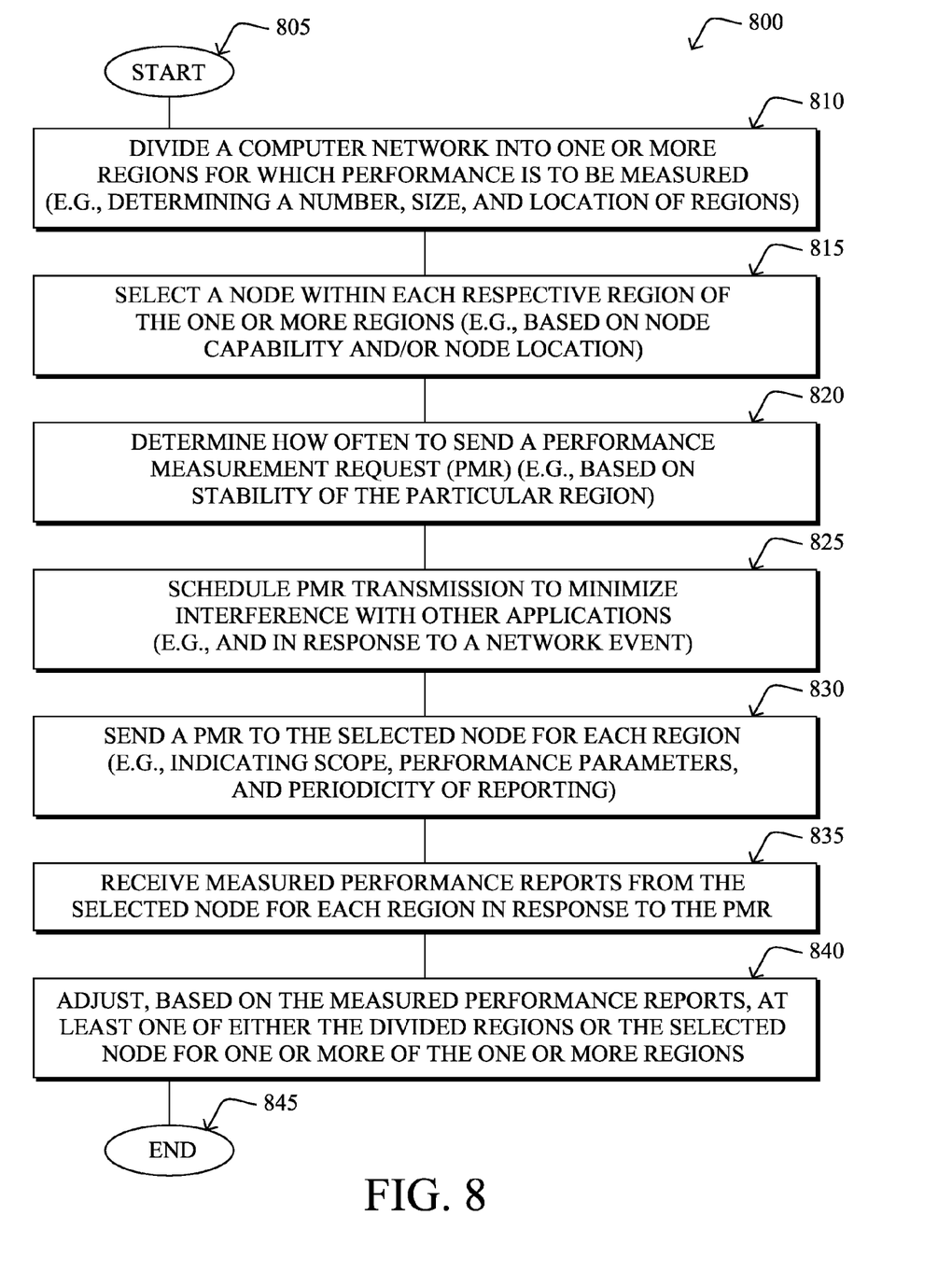
FIG. 8 illustrates an example simplified procedure for centrally driven performance analysis.

FIG. 8 illustrates an example simplified procedure for centrally driven performance analysis in accordance with one or more embodiments described herein, e.g., from the perspective of an NMS 120. The procedure 800 starts at step 805, and is continues to step 810, where, as described in greater detail above, the NMS divides a computer network 100 into one or more regions 600 for which performance is to be measured. For instance, as noted, the division may be based on determining a number, size, and location of regions. In addition, in step 815, the NMS 120 also selects a node (one or more nodes) 110 within each respective region of the one or more regions, e.g., based on node capability and/or node location. Further centrally driven factors may also be determined by the NMS, such as determining in step 820 how often to send a PMR 300 (e.g., based on stability of the particular region, as noted above), and/or scheduling PMR transmission in step 825 to minimize interference with other applications. Note also that as described above, PMR transmission may be explicitly in response to a network event, such as to troubleshoot a particular area.

In step 830, the NMS 120 sends a PMR 300 to the selected node for each region, and may thus indicate scope (322), performance parameters (324), and periodicity of reporting (326). Note that while the description sometimes references sending a PMR "to each region," the NMS may in fact send specifically tailored PMRs to one or more regions 600 (e.g., a subset) as desired (therefore, "to each region" herein should be read as "to each region to which a PMR is currently being sent"). In step 835 the NMS 120 receives measured performance reports 400 from the selected node 110 for each region (that was probed) in response to the PMR 300. Based on the measured performance reports, the NMS may then correspondingly adjust (if necessary) at least one of either the divided regions or the selected node for one or more of the regions, as described in greater detail above, e.g., for future performance measuring and analysis, accordingly.

The procedure 800 illustratively ends in step 845, however the procedure may essentially return to any of steps 810-835 above at any time in order to adjust various parameters, request further measurements, receive further reports, etc., and the adjustment to the regions 600 and/or selected nodes, etc., may continue based on up-to-date network metrics and characteristics. It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for centrally driven performance analysis in a computer network. In particular, by using an adaptive and/or triggered SLA measurement mechanism driven by the NMS as described above, the techniques herein respond to the actual time-scale and/or spatial-scale characteristics of the statistics being gathered and analyzed, dynamically focusing and/or optimizing performance measurement, while minimizing interference with user traffic. That is, unlike conventional systems, the techniques herein identify regions and initiate of performance measurement in those regions based on the measurement data received from the region (e.g., historic stability, etc.).

While there have been shown and described illustrative embodiments that provide for centrally driven performance analysis in a computer network, it is to be understood that various other adaptations and modifications may be made within the spirit and scope of the embodiments herein. For example, the embodiments have been shown and described herein with relation to LLNs. However, though particularly well-suited for LLNs and constrained networks in general, the embodiments in their broader sense are not as limited, and may, in fact, be used with other types of networks. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   dividing a computer network into one or more regions for which performance is to be measured, wherein each region of the one or more regions makes up an area of the computer network;
   selecting one or more nodes within each respective region of the one or more regions;
   determining how often to send a performance measurement request (PMR);
   scheduling the sending of the PMR to minimize interference with one or more applications operating in the computer network;
   sending the PMR to the one or more selected nodes for each region; receiving measured performance reports from the one or more selected nodes for each region in response to the PMR; and
   adjusting, based on the measured performance reports, at least one of either the divided regions or which of the one or more nodes is selected for one or more of the one or more regions.

2. The method as in claim 1, wherein selecting the one or more nodes within each respective region comprises:
   selecting the one or more nodes based on at least one of either node capability or node location.

3. The method as in claim 1, wherein determining how often to send a PMR to a particular region is based on stability of the particular region.

4. The method as in claim 1, wherein dividing the computer network into the one or more regions comprises:
   determining a number of regions, a size of regions, and a location of regions within the computer network.

5. The method as in claim 4, further comprising:
   initializing a selected number of regions with substantially similar size without knowledge of any performance measurements; and iterating the number, size, and location of regions based on received performance measurements.

6. The method as in claim 1, further comprising:
indicating, within the PMR to a particular selected node for a particular corresponding region, a scope of the PMR, wherein the scope is selected from a group consisting of local scope of the particular node and regional scope for the particular corresponding region.

7. The method as in claim 1, further comprising:
indicating, within the PMR to a particular selected node for a particular corresponding region, a list of one or more performance parameters to measure.

8. The method as in claim 7, wherein the performance parameters comprise local resources selected from a group consisting of: memory-based metrics, processor-based metrics, and energy-based metrics.

9. The method as in claim 7, wherein the performance parameters comprise regional network statistics selected from a group consisting of: path metrics, delay metrics, latency metrics, packet loss metrics, and throughput metrics.

10. The method as in claim 1, further comprising:
indicating, within the PMR to a particular selected node for a particular corresponding region, a periodicity of reporting, wherein the periodicity of reporting specifies a number of measurements to be performed by the particular selected node over a specified period of time.

11. The method as in claim 1, further comprising:
sending a particular PMR to one or more particular region in response to a network event.

12. An apparatus, comprising:
one or more network interfaces to communicate in a computer network;
a processor coupled to the network interfaces and adapted to execute one or more processes;
a memory configured to store a process executable by the processor, the process when executed operable to:
divide the computer network into one or more regions for which performance is to be measured, wherein each region of the one or more regions makes up an area of the computer network;
select one or more nodes within each respective region of the one or more regions;
determining how often to send a performance measurement request (PMR);
scheduling the sending of the PMR to minimize interference with one or more applications operating in the computer network;
send the PMR to the one or more selected nodes for each region;
receive measured performance reports from the one or more selected nodes for each region in response to the PMR; and
adjust, based on the measured performance reports, at least one of either the divided regions or which of the one or more nodes is selected for one or more of the one or more regions.

13. The apparatus as in claim 12, wherein the process when executed to select the one or more nodes within each respective region is further operable to:
select the one or more nodes based on at least one of either node capability or node location.

14. The apparatus as in claim 12, wherein the process when executed to divide the computer network into the one or more regions is further operable to:
determine a number of regions, a size of regions, and a location of regions within the computer network.

15. The apparatus as in claim 12, wherein the process when executed is further operable to:
indicate, within the PMR to a particular selected node for a particular corresponding region, at least one of:
i) a scope of the PMR, wherein the scope is selected from a group consisting of local scope of the particular node and regional scope for the particular corresponding region;
ii) a list of one or more performance parameters to measure; and
iii) a periodicity of reporting, wherein the periodicity of reporting specifies a number of measurements to be performed by the particular selected node over a specified period of time.

16. The apparatus as in claim 12, wherein the process when executed is further operable to:
send a particular PMR to one or more particular region in response to a network event.

17. A tangible, non-transitory, computer-readable media having software encoded thereon, the software when executed by a processor operable to:
divide a computer network into one or more regions for which performance is to be measured, wherein each region of the one or more regions makes up an area of the computer network;
select one or more nodes within each respective region of the one or more regions;
determining how often to send a performance measurement request (PMR);
scheduling the sending of the PMR to minimize interference with one or more applications operating in the computer network;
send the PMR to the one or more selected nodes for each region;
receive measured performance reports from the one or more selected nodes for each region in response to the PMR; and
adjust, based on the measured performance reports, at least one of either the divided regions or which of the one or more nodes is selected for one or more of the one or more regions.

18. The computer-readable media as in claim 17, wherein the software when executed is further operable to:
indicate, within the PMR to a particular selected node for a particular corresponding region, at least one of:
i) a scope of the PMR, wherein the scope is selected from a group consisting of local scope of the particular node and regional scope for the particular corresponding region;
ii) a list of one or more performance parameters to measure; and
iii) a periodicity of reporting, wherein the periodicity of reporting specifies a number of measurements to be performed by the particular selected node over a specified period of time.

19. The computer-readable media as in claim 17, wherein the software when executed is further operable to:
send a particular PMR to one or more particular region in response to a network event.

* * * * *